Dec. 31, 1968  P. HEDGEWICK  3,419,244
PLASTIC VIAL MOLDING APPARATUS
Filed Aug. 19, 1966
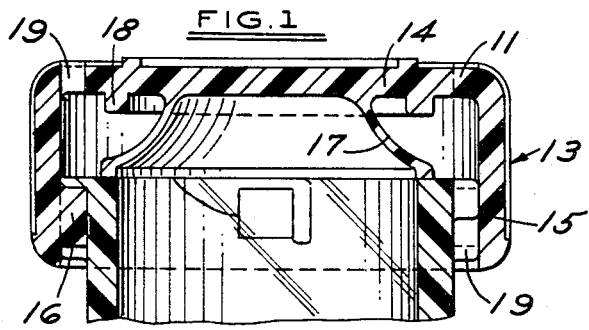
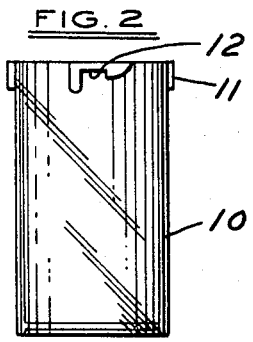
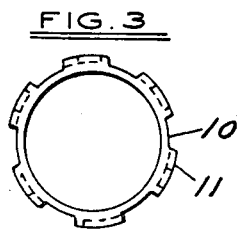
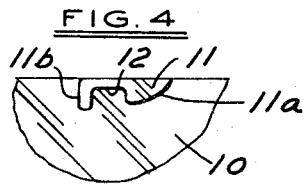
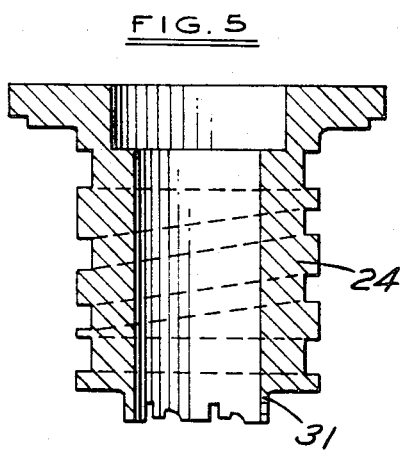
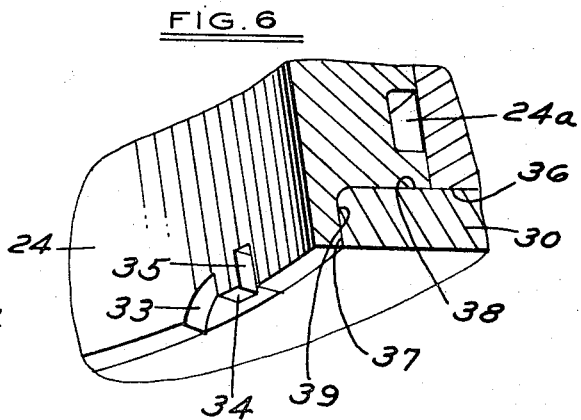
INVENTOR
PETER HEDGEWICK
BY
Barnes, Kisselle, Raisch & Choate
ATTORNEYS

United States Patent Office 3,419,244
Patented Dec. 31, 1968

3,419,244
PLASTIC VIAL MOLDING APPARATUS
Peter Hedgewick, Windsor, Ontario, Canada, assignor to Reflex Corporation of Canada Limited, Windsor, Ontario, Canada, a corporation of Canada
Filed Aug. 19, 1966, Ser. No. 573,600
6 Claims. (Cl. 249—79)

This invention relates to molding apparatus and particularly to an apparatus for molding plastic vials.

In my copending United States patent application Ser. No. 540,338 filed Apr. 5, 1966, now Patent No. 3,344,942, there is disclosed and claimed a plastic safety cap and container or vial construction which incorporates a novel cap that engages a plurality of circumferentially spaced projections or lugs on the upper peripheral portion of the container or vial. In the manufacture of such a container or vial, it is essential that the projections or lugs be formed accurately.

Among the objects of this invention are to provide a novel molding apparatus for molding said containers or vials which is accurate, easy to construct, low in cost, and has long life.

Basically, the apparatus comprises a mold insert having a generally cylindrical cavity defining the outer surface of the cylindrical portion of the plastic container, and a cavity ring surrounding the open end of the mold insert. The mold insert has an axially extending integral wall in contact with the inner surface of the cavity ring. The integral wall has a free edge with portions thereof axially cut away throughout the radial thickness of the wall to define spaces into which plastic will flow to form the radial projections of the container after a core has been inserted to define the inner surface of the cylindrical portion of the container.

In the drawings:

FIG. 1 is an enlarged fragmentary vertical sectional view through a safety cap and container construction to which the applicant's invention is directed.

FIG. 2 is a side elevational view of the container to which the applicant's invention is directed.

FIG. 3 is a plan view of the container shown in FIG. 2.

FIG. 4 is a fragmentary side elevational view on an enlarged scale of a portion of the container shown in FIGS. 2 and 3.

FIG. 5 is a sectional view through a part of the molding apparatus shown in FIG. 7.

FIG. 6 is an enlarged fragmentary sectional perspective view of a portion of the molding apparatus shown in FIG. 7.

Figure 7:
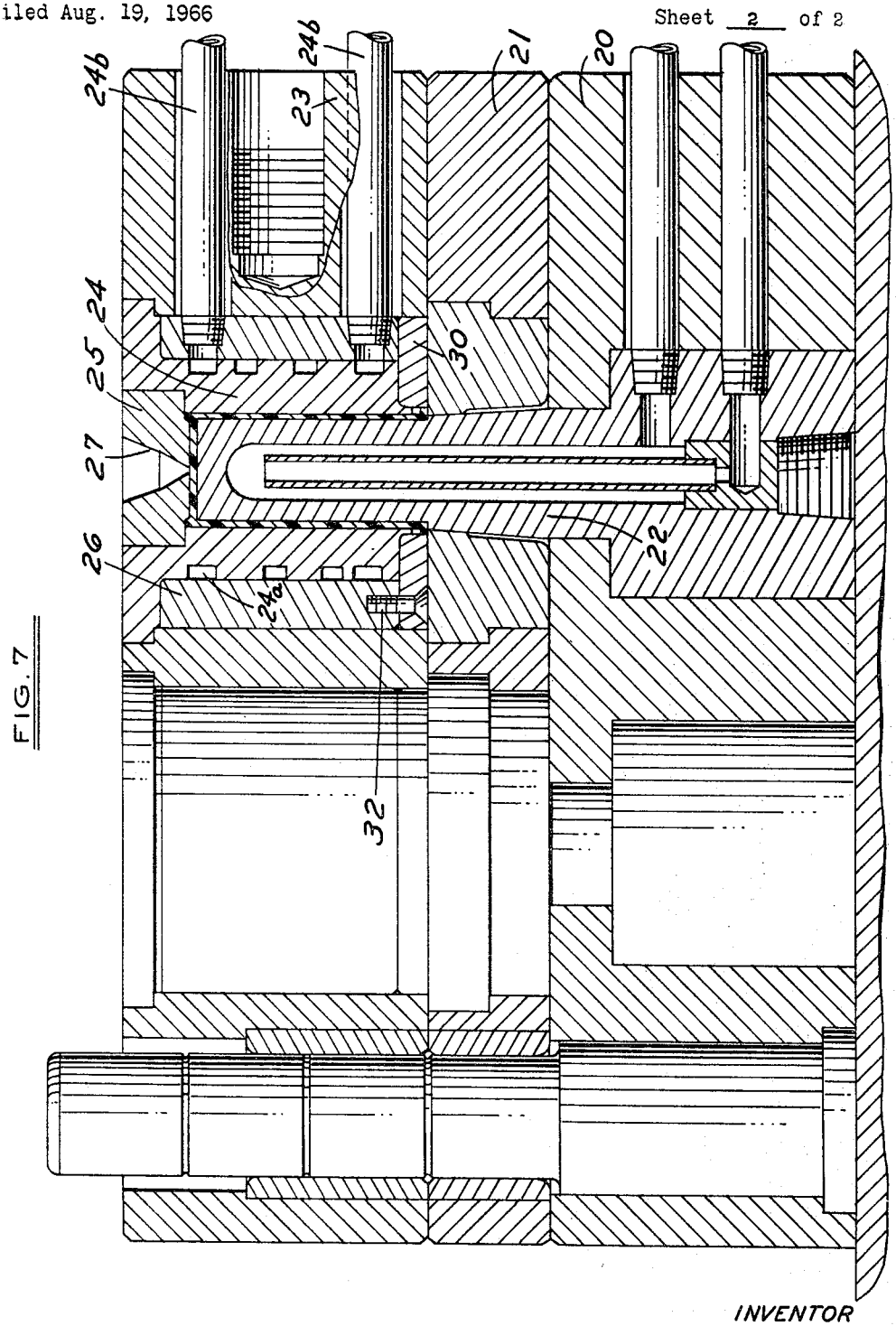
FIG. 7 is a sectional view through the molding apparatus embodying the invention.

Basically, the safety cap and container construction disclosed and claimed in the aforementioned patent application comprises a cylindrical plastic container or vial 10 which has circumferentially spaced radially extending projections 11 on the upper end thereof that have notches 12 therein. The cap 13 embodying the invention comprises a one-piece plastic body having a base 14 and peripheral flange 15 with circumferentially spaced lugs 16 extending radially inwardly for engagement with the projections 11. An annular integral flexible web 17 is provided on the inner surface of the base 14 and extends downwardly and outwardly for engagement with the upper end of the container 10. An annular integral rib 18 on the inner surface of the base 14 overlies the annular flexible web 17 and serves as a stop to prevent overflexing of the web 17. The base 14 of the cap includes circumferential openings 19 which facilitate its manufacture as a one-piece plastic cap but do not interfere with the sealing action of the annular web. The cap 13 is applied to the container by a rotating movement. The cap can only be removed from the container by applying an axial force on the periphery of the cap and thereafter rotating the cap.

As shown in FIG. 4, the projection 11 includes an inclined portion 11a which is engaged by a lug 16 as the cap is rotated to gradually urge the cap axially downwardly until the lug 16 reaches the notch 12. Each projection 11 also includes an elongated wall 11b that extends axially downwardly a greater distance than any portion of the surface 11a.

As shown in FIG. 7, the molding apparatus comprises a stationary core retainer 20, and a stripper plate 21 mounted on the core retainer. The core retainer 20 supports a core 22 that projects upwardly above the stripper plate 21 and into a cavity of the cavity retainer 23 when the cavity retainer is moved down against the stripper plate.

Cylindrical cavity inserts 24, 25 cooperate to define the cylindrical space S into which plastic is to be injected for molding the vial. A cylindrical wall 26 surrounds the cavity insert 24 and cooling fluid is supplied to annular core grooves 24a in the insert 24 through conduits 24b. The cavity insert 25 is formed with an inlet 27 into which the nozzle (not shown) of an injector extends to supply plastic to the space for forming the vial.

In accordance with the invention the free open end of the vial is formed by a cavity ring 30 that is held in position by screws 32 over the lower end of the insert 24 and wall 26 and fits closely around the end 31 of the insert 24.

As shown in FIGS. 5 and 6, the end 31 of the wall has portions thereof machined completely therethrough to produce the desired configuration of the projections 11 of the plastic vial 10. As shown in FIGS. 5 and 6, the cutaway portions define surfaces 33, 34 and a cavity 35 which are intended to mold or define the corresponding surfaces 11a, notch 12 and portion 11b in FIG. 4. The cavity ring 30 includes a substantially flat surface 26 and an axially extending cylindrical surface 37 which engage complementary surfaces 38 and 39 on the insert 24 of the mold. Thus, the inner wall of the insert 24 defines the outer wall of the vial 10 during molding. The outer surface of the projections 11 is defined by the ring 30 while the axial surfaces of the projections 11 are defined by the cutaway portions on the end 31 of the insert 24.

By this arrangement it is possible to accurately form the molding surfaces which define the projections 11 on the vial accurately without the necessity of having to form depressions accurately in the side wall of the mold. This substantially reduces the labor and cost of the mold and facilities mold repair and replacement. In addition, it is possible to obtain accuracy of the molding surfaces which cannot easily be obtained by conventional mold making techniques.

Greater accuracy can be achieved by making the insert 24 of high grade steel which can be hardened before forming the cutaway portions thereby avoiding any loss of accuracy which may occur if it were required to harden the insert after the portions were cut away. The position of the cutaway portions circumferentially of the insert is accurately controlled by forming the insert with an extremely accurate inside diameter which is then utilized as a guide for determining the position of the cutaway portions.

I claim:

1. In an apparatus for making a plastic container or the like comprising a generally cylindrical body with a bottom wall and an open end and a plurality of circumferentially spaced outwardly extending radial projections on the outer surface of the cylindrical portion thereof adjacent the open end, the combination comprising
- a mold insert having a generally cylindrical cavity defining the outer surface of the cylindrical portion of the plastic container,
- a cavity ring surrounding the open end of said mold insert,
- said mold insert having an axially extending integral wall in contact with the inner surface of said cavity ring,
- said integral wall having a free edge with portions thereof axially cut away throughout the radial thickness of said wall to define spaces into which plastic will flow to form the radial projections on the container,
- and a core cooperating with said mold insert and having an outer surface defining the inner surface of the cylindrical portion of the container.

2. The combination set forth in claim 1 including a wall surrounding said mold insert and cooling passage between said wall and said insert.

3. The combination set forth in claim 1 wherein said cavity ring is removable to permit reshaping of the edge portions of the integral wall.

4. In an apparatus for making a plastic container or the like comprising a generally cylindrical body with a bottom wall and an open end and a plurality of circumferentially spaced outwardly extending radial projections on the outer surface of the cylindrical portion thereof adjacent the open end, the combination comprising
- a mold insert having a generally cylindrical cavity defining the outer surfaces of the cylindrical portion of the plastic container and the outer surface of the bottom wall of the plastic container,
- a removable cavity ring surrounding the open end of said mold,
- said mold insert having an axially extending cylindrical integral wall in contact with the inner surface of said removable ring,
- said integral wall having a free edge with portions thereof axially cut away throughout the radial thickness of said wall to define spaces into which plastic will flow to form the radial projections on the container,
- and a core cooperating with said mold insert and having an outer surface defining the inner surface of the cylindrical portion and the inner surface of the bottom wall of the container.

5. The combination set forth in claim 4 including a wall surrounding said mold insert and cooling passage between said wall and said insert.

6. In an apparatus for making a plastic container or the like comprising a generally cylindrical body with a bottom wall and an open end and a plurality of circumferentially spaced outwardly extending radial projections on the outer surface of the cylindrical portion thereof adjacent the open end, the combination comprising
- a mold having a generally cylindrical cavity defining the outer surface of the cylindrical portion of the plastic container,
- a cavity ring surrounding the open end of said mold,
- said mold having an axially extending wall in contact with the inner surface of said cavity ring,
- said wall having a free edge with portions thereof axially cut away throughout the radial thickness of said wall to define spaces into which plastic will flow to form the radial projections on the container,
- and a core cooperating with said mold and having an outer surface defining the inner surface of the cylindrical portion of the container.

References Cited

UNITED STATES PATENTS

| | | | |
|---|---|---|---|
| 2,733,479 | 2/1956 | English | 249—68 |
| 2,834,989 | 5/1958 | Kusnery | 249—68 |
| 2,900,666 | 8/1959 | Marcus | 249—142 X |
| 3,031,722 | 5/1962 | Gits | 18—42 X |
| 3,099,046 | 7/1963 | Klumpp | 249—142 |
| 3,159,701 | 12/1964 | Herter. | |
| 3,225,126 | 12/1965 | Bridge et al. | 18—5 |
| 3,371,387 | 3/1968 | Clereman et al. | 18—42 |

J. HOWARD FLINT, JR., *Primary Examiner.*

U.S. Cl. X.R.

18—42; 249—144